United States Patent
Chéné

(10) Patent No.: US 6,406,214 B1
(45) Date of Patent: Jun. 18, 2002

(54) ASSEMBLY SYSTEM AND METHOD, AND DEVICES PROVIDED WITH THIS SYSTEM

(75) Inventor: Emmanuel Chéné, Paris (FR)

(73) Assignee: Elyce Innovation, Nantes Cedex (FR)

( * ) Notice: Subject to any disclaimer, the term of this patent is extended or adjusted under 35 U.S.C. 154(b) by 0 days.

(21) Appl. No.: 09/297,883

(22) PCT Filed: Nov. 21, 1997

(86) PCT No.: PCT/FR97/02031

§ 371 (c)(1), (2), (4) Date: Jul. 13, 1999

(87) PCT Pub. No.: WO98/21491

PCT Pub. Date: May 22, 1998

(30) Foreign Application Priority Data

Nov. 12, 1996 (FR) .............................................. 96 13768
May 21, 1997 (FR) .............................................. 97 06197

(51) Int. Cl.[7] .............................. B65D 85/57; F16B 7/04
(52) U.S. Cl. ...................................... 403/350; 206/308.1
(58) Field of Search ....................... 206/308.1; 403/282, 403/350; 366/205

(56) References Cited

U.S. PATENT DOCUMENTS

| | | | | |
|---|---|---|---|---|
| 2,284,847 A | * | 6/1942 | Raymond | .................. 403/350 |
| 2,322,420 A | * | 6/1943 | Craig | .......................... 403/350 |
| 2,755,900 A | * | 7/1956 | Seyfried | .................... 366/205 |
| 3,579,809 A |   | 5/1971 | Wolf et al. | |
| 3,596,692 A | * | 8/1971 | Swanke | ...................... 366/205 |
| 3,680,897 A | * | 8/1972 | Linthout | .................... 287/20 R |
| 4,019,298 A |   | 4/1977 | Johnson, IV | |
| 4,419,026 A | * | 12/1983 | Leto | ........................ 403/351 X |
| 5,407,295 A | * | 4/1995 | Kuhl | ........................... 403/350 |
| 5,582,488 A | * | 12/1996 | Dudley et al. | .............. 403/103 |
| 5,636,923 A | * | 6/1997 | Nejat-Bina | ................. 366/205 |
| 5,855,431 A | * | 1/1999 | Costanzo | ................. 366/205 X |
| 6,053,311 A | * | 4/2000 | Grobecker et al. | ...... 206/308.1 |

FOREIGN PATENT DOCUMENTS

| | | | | |
|---|---|---|---|---|
| AU | 110872 | * | 6/1940 | ................. 403/350 |
| DE | 31 30 470 | | 2/1983 | |
| DE | 39 03 508 | | 8/1990 | |
| GB | 6145 | * | 3/1907 | ................. 403/350 |
| GB | 1009354 | | 11/1965 | |
| WO | WO 94/07038 | | 3/1994 | |
| WO | WO 94/14160 | | 6/1994 | |

OTHER PUBLICATIONS

This patent is missing parts which indicate origination.*

* cited by examiner

Primary Examiner—Lynne H. Browne
Assistant Examiner—Ernesto Garcia
(74) Attorney, Agent, or Firm—Young & Thompson

(57) ABSTRACT

A system for assembling first and second parts of a device, including first and second coupling elements respectively associated with the first and second parts of the device. The coupling elements each include one or several contact zones arranged for spatially guiding the first and second parts during their relative displacement. These contact zones can consist in one or several sloping ramps arranged in circular manner on the internal face of the first or second corresponding part. The first and second coupling elements can be made without undercut and arranged to be subjected to a deformation during gradual clamping so as to provide a substantially normal resistance at the interface zone.

9 Claims, 10 Drawing Sheets

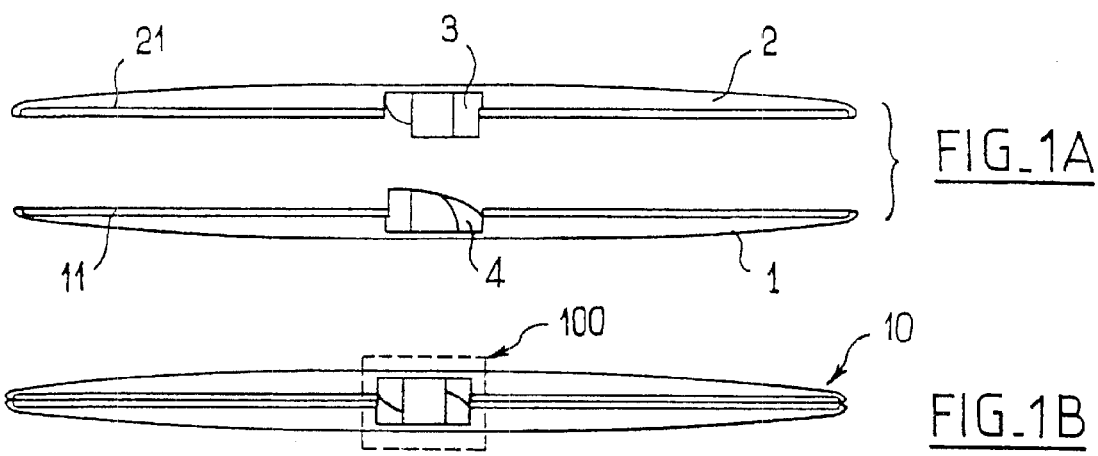
FIG_1A
FIG_1B
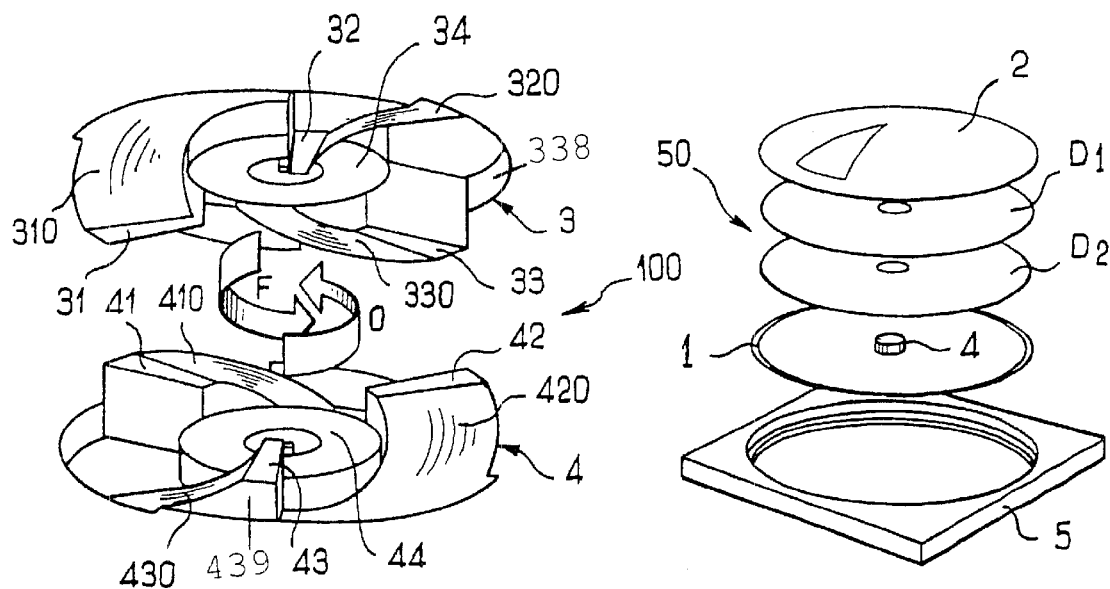
FIG_2
FIG_3
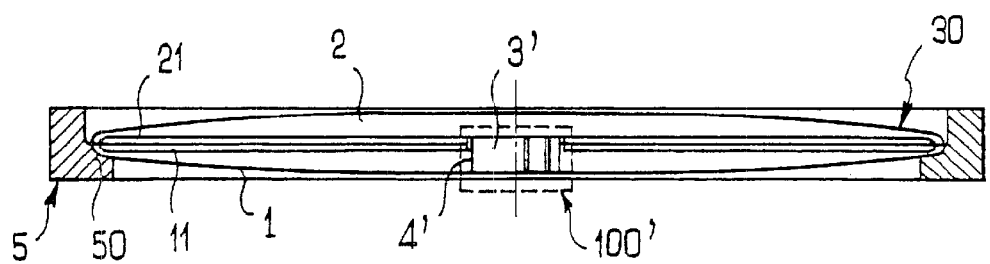
FIG_4

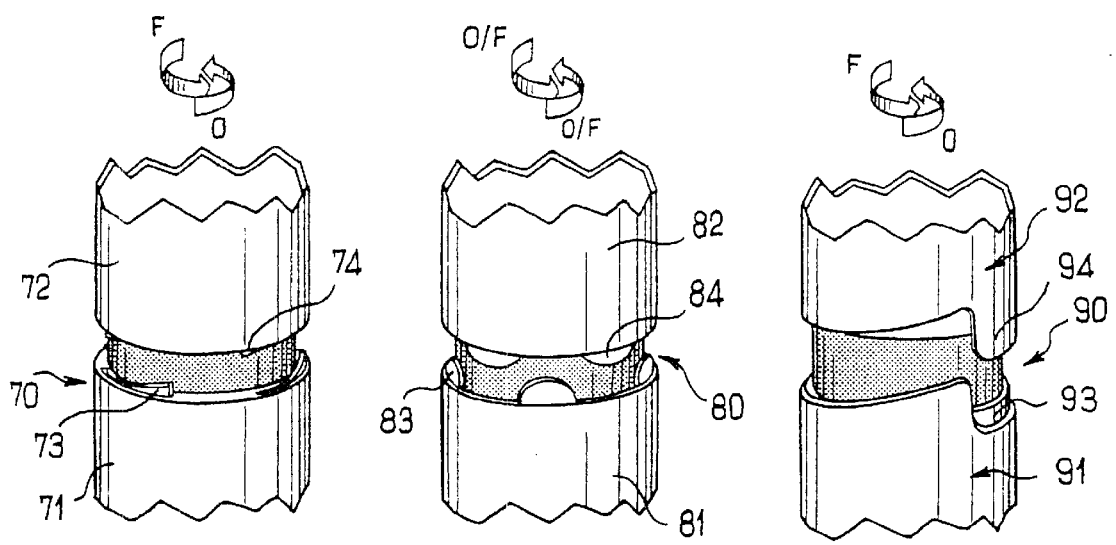
FIG_7  FIG_8  FIG_9
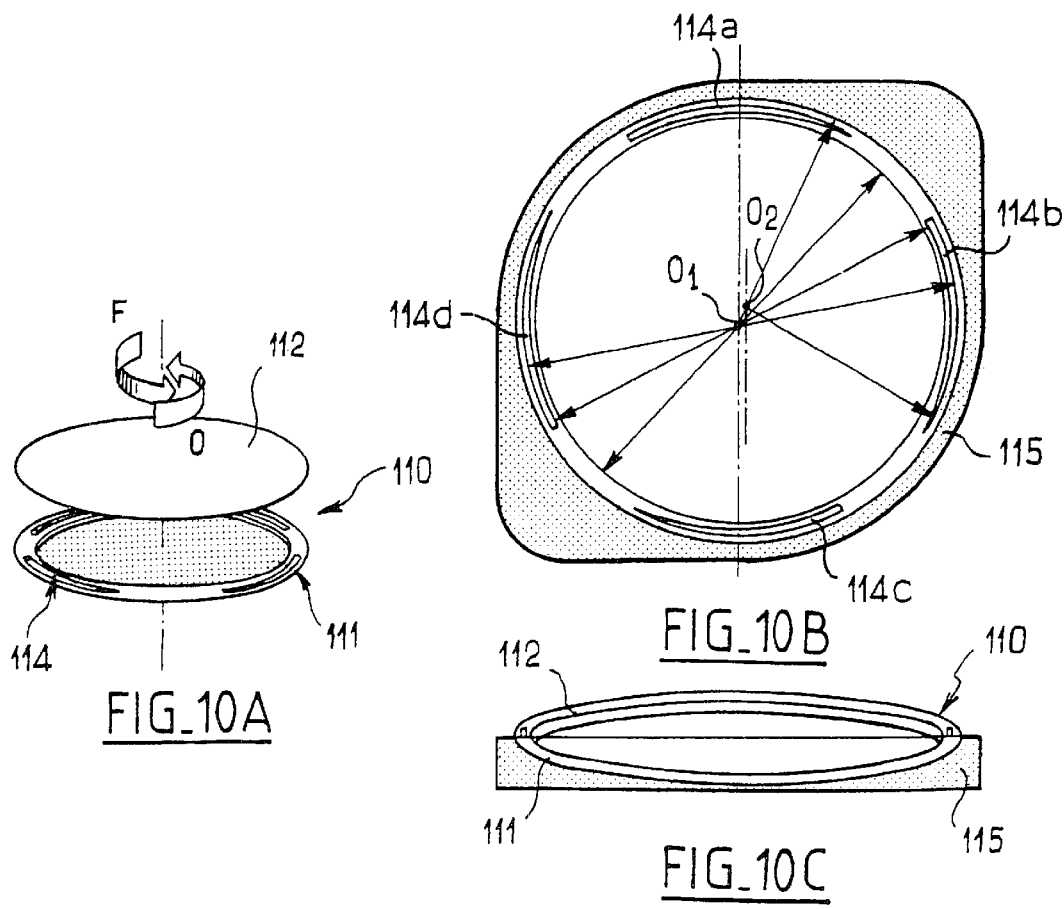
FIG_10A  FIG_10B  FIG_10C

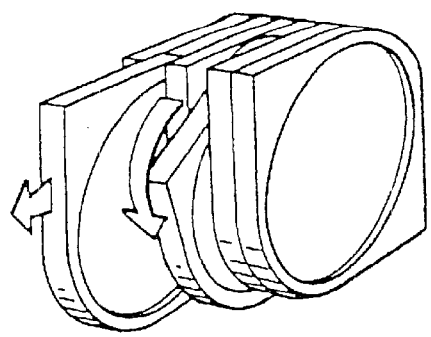
FIG.10D
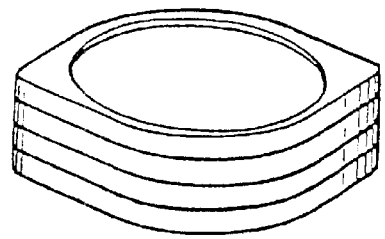
FIG.10E
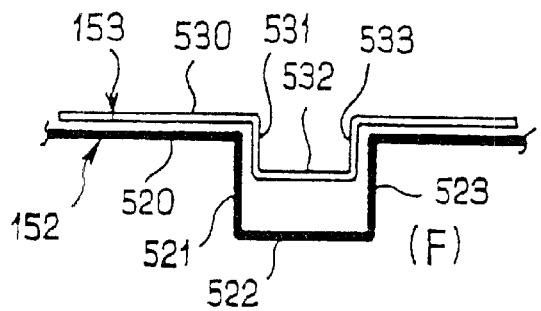
FIG.15
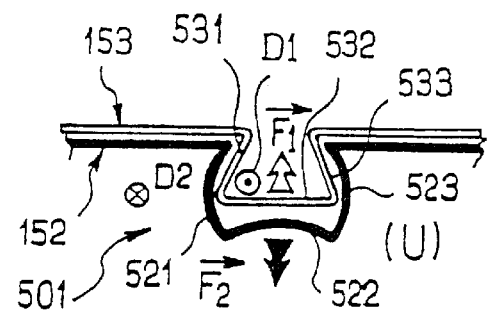
FIG.16
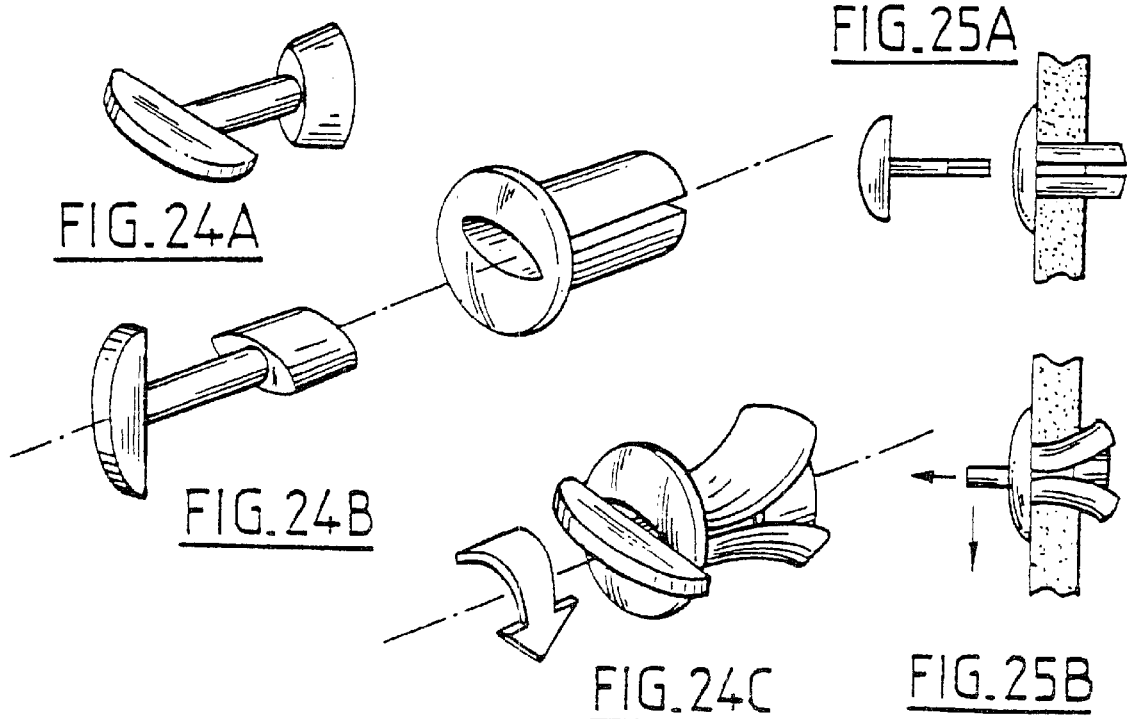
FIG.24A
FIG.24B
FIG.24C
FIG.25A
FIG.25B

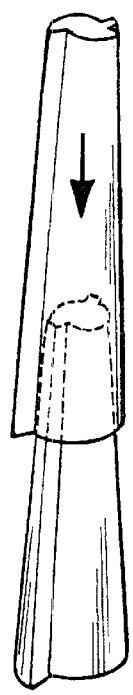
FIG.11
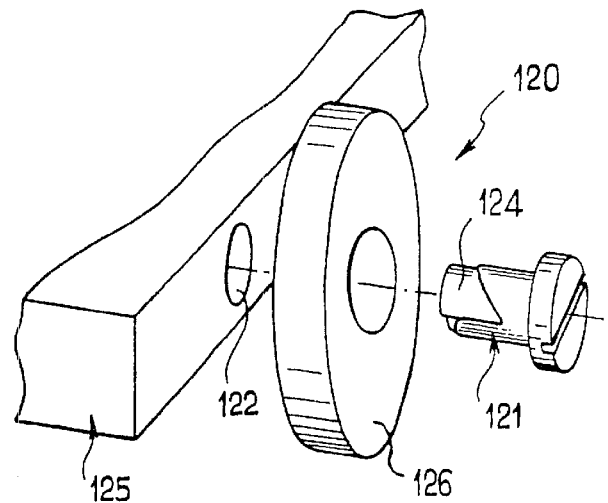
FIG.12
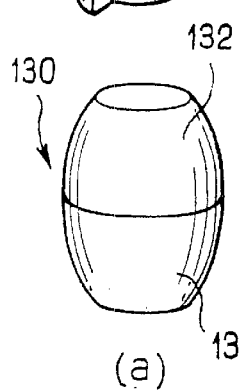
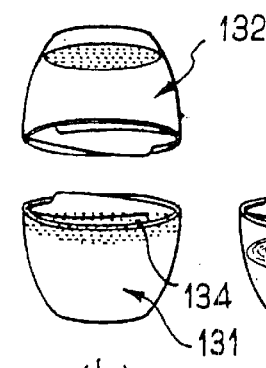
(a)  (b)  (c)
FIG.13
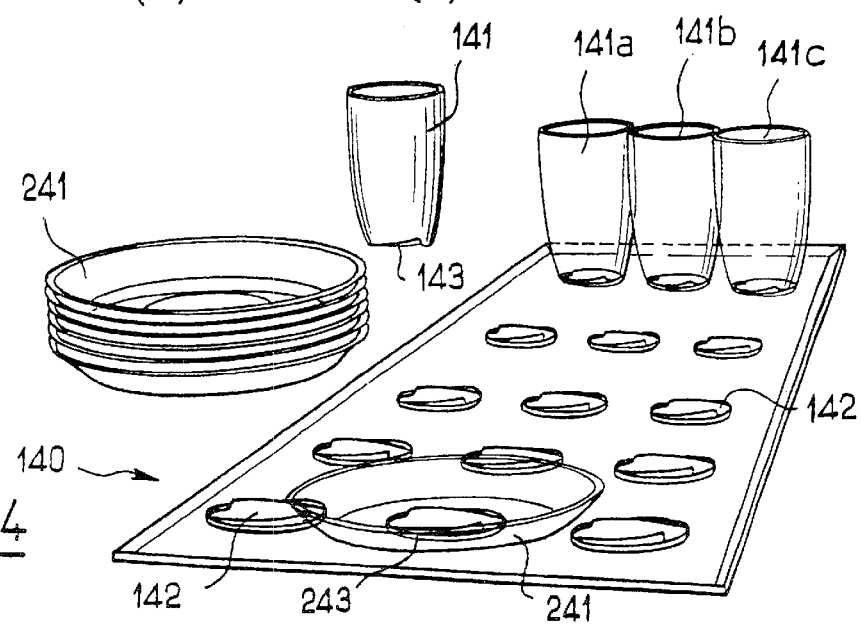
FIG.14

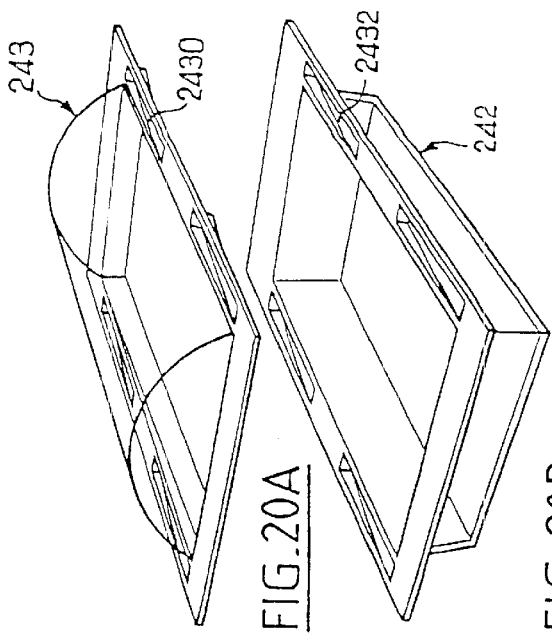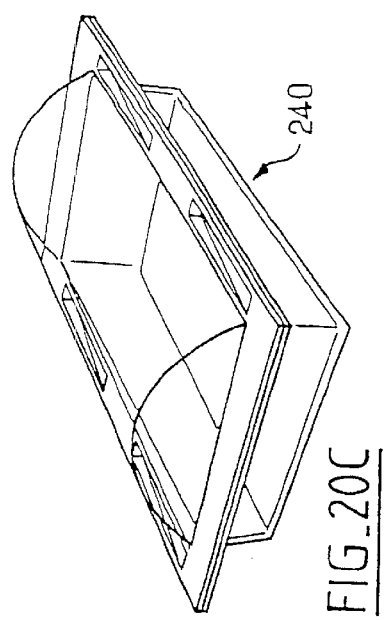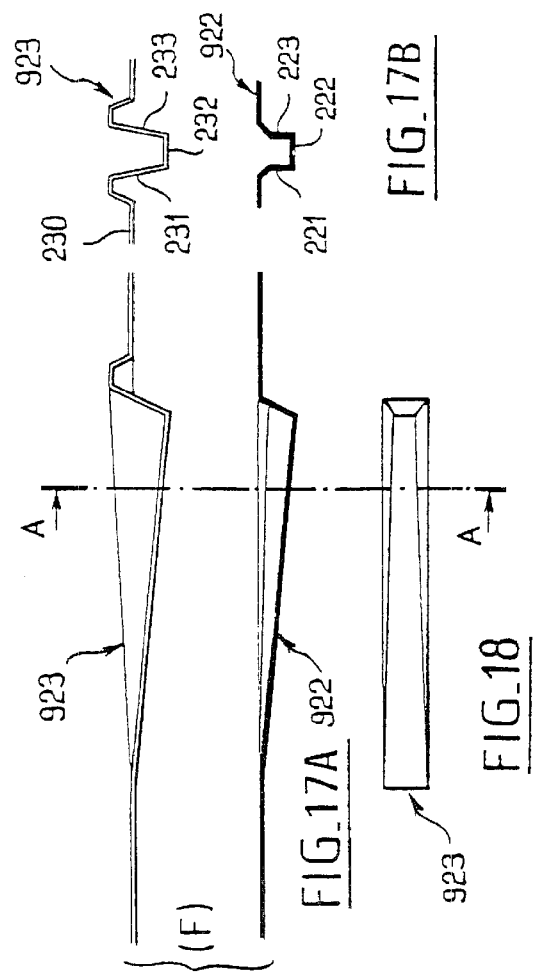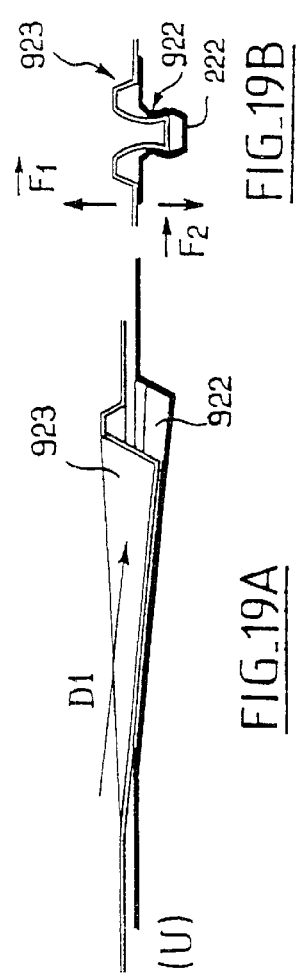

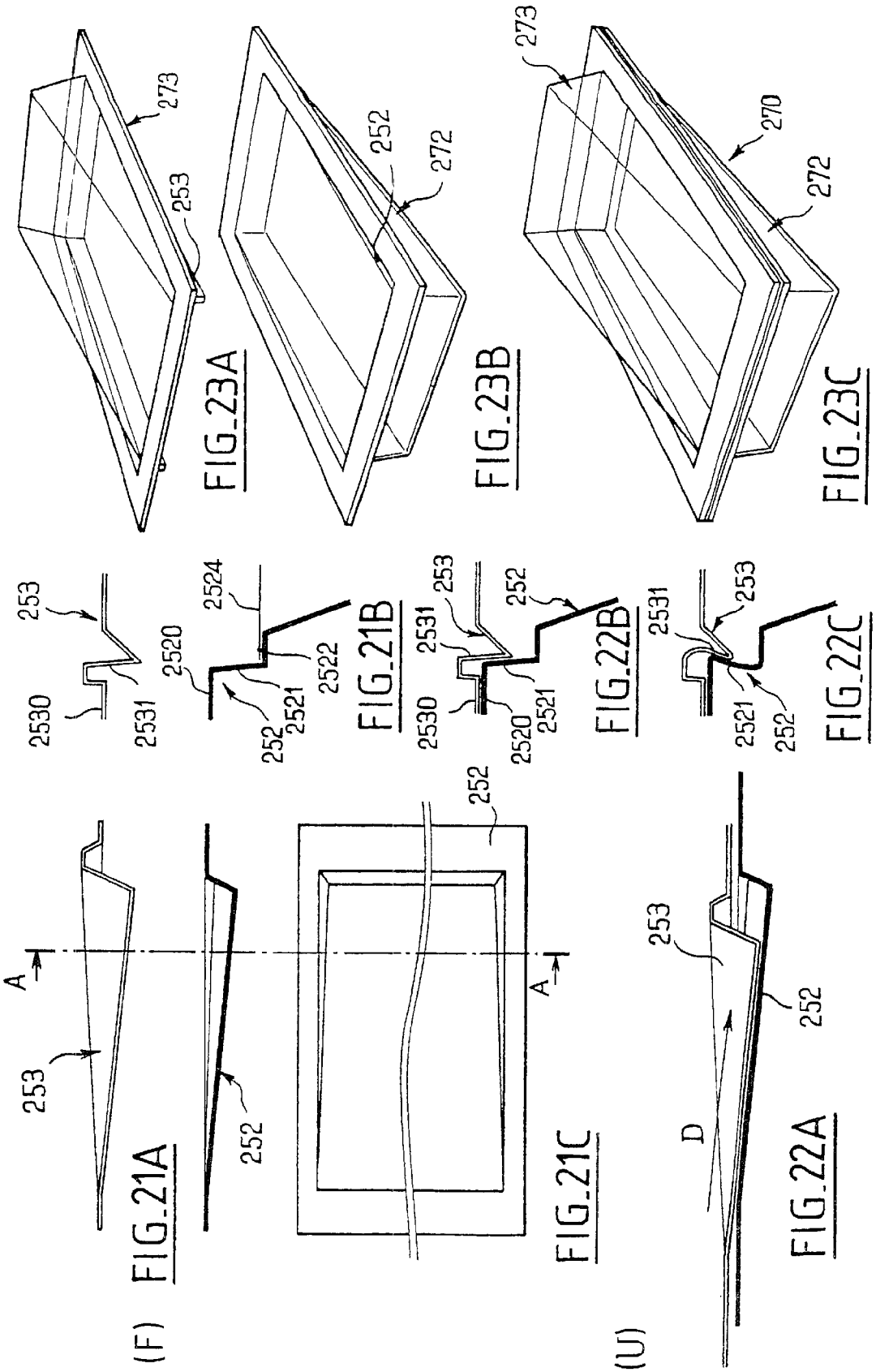

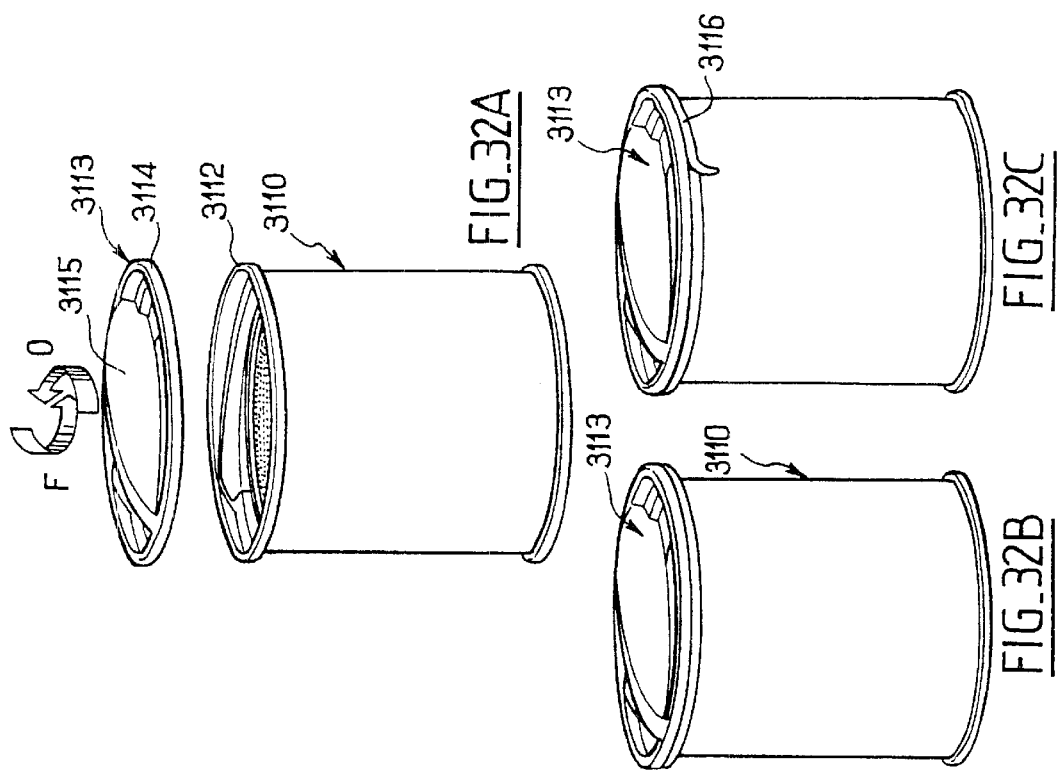
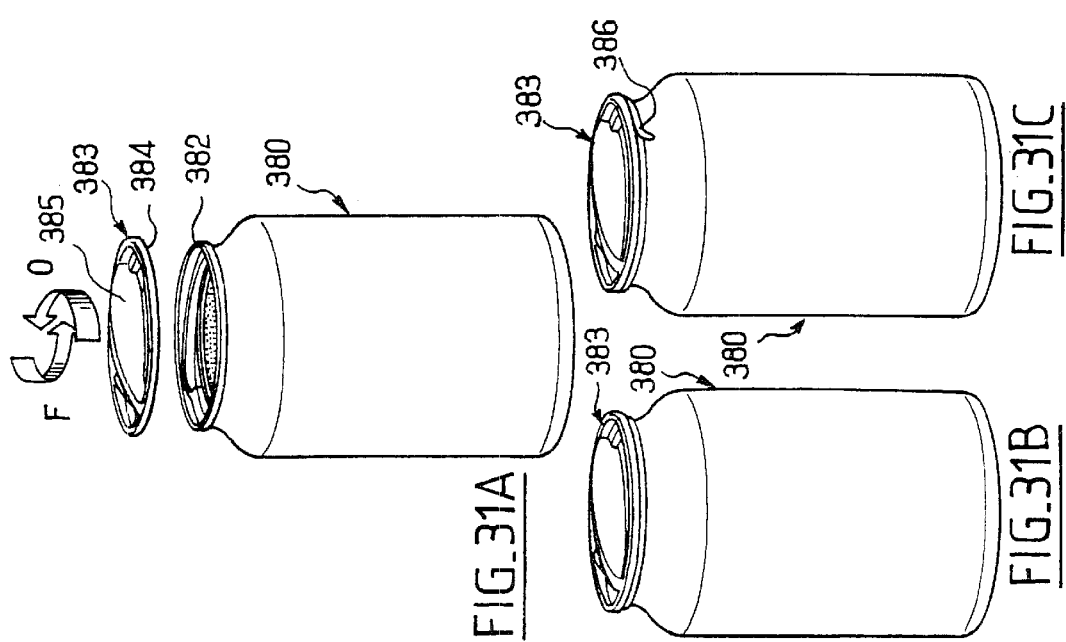

ASSEMBLY SYSTEM AND METHOD, AND DEVICES PROVIDED WITH THIS SYSTEM

BACKGROUND OF THE INVENTION

The present invention concerns an assembly system and a method employing this system, as well as devices, particularly container devices such as boxes or cases, provided with this system.

Hereinafter various definitions of the concepts employed are given as follows;

By displacement there is meant any translation, rotation and combinations of translations and rotations.

By interface zone there is meant any junction or joint plane between two parts of an opening/closing system or assembly.

By sliding zone there is meant any zone of the approach of one part of an assembly system onto the other part of this system.

In relation to retention force, the expression normal force will be used in the case of a translation, and the expression axial force in the case of a rotation.

In relation to clamping force, the expression force perpendicular to the displacement will be used in the case of a translation, and the expression radial force in the case of a rotation.

By thin wall there is meant any wall made from plastic or metallic materials; in foils, formed notably by thermo forming, stamping or any other equivalent technique, and shaped by rotary moulding, injection moulding, blow moulding etc.

DESCRIPTION OF THE RELATED ART

In many fields, such as those of cosmetics, perfumery, foodstuffs and consumer goods, products or articles are sold in rigid boxes or cases. These boxes or cases generally comprise a main part destined to contain the product or the article, and a removable part, for example a lid or closure, with which there is associated an assembly system.

Reversible assembly systems are known, for example, that operate by screwing, by clipping, by forcible insertion or yet again by hinging. Existing assembly systems, however, display inconveniences in use, being in particular difficult and even tricky to manipulate when it is necessary to effect several turns of the screw, or yet again being fragile when they are subjected to repeated use as can be the case with compact discs cases or with powder compacts in perfumery. Existing assembly systems are costly to manufacture. They require different male and female parts involving very costly equipment for their manufacture with a production-rate held back by the internal kinematics.

Tubular assembly systems are known, particularly from Publication WO94/07038, that employ the effect of clamping by radial jamming produced by rotation of a male tubular part within a female tubular part, these tubular parts having appropriate shapes for example, in the form of cams. In these tubular assembly systems the problems of gripping and of ergonomics do not arise.

It is not, however, the same in the majority of the previously-mentioned applications, with which the consumers want boxes or cases allowing easier and more rapid access to the products or articles contained in these boxes or cases.

BRIEF DESCRIPTION OF THE INVENTION

The object of the present invention is to satisfy these desires on the, part of the consumers as well as on the part of the manufacturer and to remedy the previously mentioned inconveniences by proposing a rapid assembly system which is allied with a much greater facility in use and a greater solidity as well as requiring simple equipment, enabling increased rates of production without need of internal kinematics.

The assembly system according to the invention preferably, but non-limitingly, envisages devices provided with thin walls. It is particularly appropriate for assembly systems to be made from easily or strongly deformable materials. This relates notably to specific technical applications and sectors for example in the foodstuffs or cosmetic industry, which demand a resistance to removal (axial retention or normal to the interface zone) as well as a sealing of the container or the packaging equipped with this system. Besides that, for these products one generally looks for recloseability guaranteeing preservation and hygiene, most especially when it relates to products not consumed all at once, in foodstuffs or pharmacology. More generally, the problem of normal or axial retention arises when the contents exert a pressure within the enclosure (gaseous drinks, spray, etc . . . ) or when one wants the assembly to he able to he lifted by the lid.

It is to be noted that the system according to the invention moreover allows for a greater margin of tolerance than with previous methods, and thus yields a supplementary advantage in terms of the life-expectancy of the equipment, backlash elimination, and assemblies of different materials displaying distinct manufacturing tolerances, for example in plastic/glass, plastic/wood assemblies.

In the case of rotation, the action is compensated by reactions which have radial components but also axial components. The axial retention is obtained due to the clamping force thanks to a deformation of the material. The judiciously exploited deformations enable creation of an undercut in use although this undercut does not exist during manufacture. This enables one to obtain a retention approaching that of a nut-and-bolt, quarter turn or swallow tail system, while retaining the advantages and the originality of a system based upon manufacture without undercut, therefore easier, less costly and more rapid.

As for sealing, the invention makes it possible to impose a lid onto a base so as to ensure horizontal sealing directly or perhaps achieved via an intermediate jointure, squeezed between the lid and the base. In the rest of the description, the terms lid and base must he understood in a broad sense.

One can advantageously envisage a mode of embodiment in which a slope is imparted in the plane normal to the interface zone and substantially tangential to the displacement. In the case of a rotation, it mimics the effect of a screw thread. In this way, after being clamped, the lid tends to be attached to the base, with a retention and a clamping of the lid of radial type but also axially.

Thus, due to the absence of undercut, one secures minimization of tooling costs and improvement in production rates.

The assembly system according to the invention can be applied to any radius of curvature and specifically in translation with an infinite radius of curvature, as well as to complex curves.

So far as concerns the deformation of the materials employed in the assembly system according to this second version of the invention, one either can reckon to remain within the elastic limit of the materials or not, implicating a remanent deformation or not. The re-use of the assembly can influence the remanent initial deformation or not.

One can also envisage a device consisting of a stack of several pieces of different sizes and shapes, provided with assembly systems according to the invention, in order to achieve volume modularity.

Furthermore, several assembly sub-systems can be distributed at several points on a device provided with a system according to the invention.

Thus, the assembly system according to the invention secures better ergonomy of use than the previous systems of assembly. In fact, the handling of the assembly or disassembly effected, by an user is aided by spatial guidance of the two parts of the system.

According to this other aspect of the invention particularly appropriate when scarcely-deformable materials are employed for making the parts of the assembly, the first and second coupling means each comprises one or more ramps disposed circularly on one internal face of the corresponding first or second part, and the ramps of the first coupling means cooperate with the ramps of the second coupling means so as, by an external act of rotation of one part relative to the other part achieved in a fraction of a turn, either to get a helicoidal motion of the part relative to the other part so as to close said assembly by and reach a progressive radial jamming, or get a reverse helicoidal motion so as to separate and decouple the parts.

Thus, the operations of assembly can be achieved without the exterior of the part including any protruding or directly grippable portions. The opening action takes place by the combination of pressing and rotating one part relative to the other. In fact, on exerting a rotation of one part, the other tends to displace following a translation motion, which has the effect of separating the two parts thus permitting them to dissociate or de-couple from gripping one of them.

The lower part and the upper part can be identical as regards the nature of the ramps, ideally the first and second coupling means can be hermaphrodites, which notably has the major advantage of requiring only one pressing for manufacture of the two parts for example by plastic injection moulding.

The jamming of the coupling means is achieved by providing projecting parts and hollow parts on the ramps, the projecting parts of the ramps on one part accommodating themselves in the hollow parts of the ramps of the other part. The size of the hollow parts diminishing progressively as the operator effects a rotation in the clockwise sense, this results in a jamming of the parts as they emerge from within the hollow parts. The clearance, positive at the start, becomes progressively negative. The two assembled parts can withstand an attempt at opening normal to their plane of assembly to a greater extent than these two parts will have been jammed one against the other by an attempt brought about by rotation in the clockwise sense.

In relation to data carrying discs, from WO9414160 there is known a case comprising two flaps articulable around a hinge axis, in which the disc is held by the center via a retainer piece making spring fixture with one of the flaps.

It is often the case that the elements of the case constituting the pivotal interconnection and the fixture of the disc in position become fragile, deteriorate and break, particularly as a result of impacts.

To overcome these inconveniences, within the scope of the present invention there is proposed a case for compact discs provided with an assembly system according to the invention arranged centrally thereof.

Besides that, one can advantageously envisage that at least one of the two removable parts shall be designed to induce an optical magnification of data and/or of artwork disposed on at least one of the faces of the disc or of a booklet contained in this case.

Between the two removable parts of the case one can insert a support jacket or a booklet of greater dimensions than those of the said case which is subsequently enclosed in a plastic film.

According to yet another aspect of the invention, there is proposed a frame for accommodating a case according to the invention. The external dimensions of this frame can moreover correspond to those of a standard compact disc case, thereby enabling use of existing storage and distribution racks one can equally envisage the manufacture of this frame in conjunction with one of the parts of the case. The frame can for example be in the shape of an eye and be designed in a second version to provide vertical hold in a stable and properly-placed position so as to enable consultation.

According to another aspect of the invention, there is proposed a method of assembly embodied in a system according to this second version of the invention fitted with a device in two removable parts, including the following steps;

bringing the two removable parts of the device provided with this system into contact, these removable parts comprising complementary forms of coupling, displacing one part relative to the other along a sliding zone, assembly by progressive clamping up to deformation of the surface substantially normal to the zone of the interface.

BRIEF DESCRIPTION OF THE DRAWINGS

Other details and advantages of the invention will further appear in the following description. In the accompanying drawings, given by way of non-limiting example:

FIG. 1A is a sectional view of the two separate parts of a case for compact discs according to the invention;

FIG. 1B is a sectional view of the case of FIG. 1A in the closed position;

FIG. 2 is a schematic view of an assembly system according to the invention;

FIG. 3 is an exploded view of a case according to the invention designed to contain two discs or one disc and a booklet;

FIG. 4 is a sectional view of another exemplary embodiment of a case for compact discs;

FIG. 7 represents a first embodiment of an assembly system according to the invention;

FIG. 8 represents a second embodiment of an assembly system according to the invention;

FIG. 9 represents a third embodiment of an assembly system according to the invention;

FIGS. 10A, 10B and 10C respectively represent an exploded view of a case according to the invention in the form of an eye, a plan view of this case provided with a surround and a sectional view of the closed case;

FIG. 10D illustrates an example of the storage of cases according to the invention in the form of an eye;

FIG. 10E illustrates a stack of cases according to the invention in the form of an eye;

FIG. 11 represents an assembly system by nesting of conical elements according to the invention;

FIG. 12 represents a fixing device or assembly set employing an assembly system according to the invention;

FIG. 13 represents a container of "shaker" type provided with an assembly system according to the invention, in different situations;

FIG. 14 illustrates an embodiment of a tray with removable elements adapted for mass transportation and employing assembly systems according to the invention;

FIG. 15 is a sectional view of two parts of the assembly system according to the invention embodied without undercut, at the stage of manufacture;

FIG. 16 is a sectional view of the system illustrated in FIG. 15, in use;

FIG. 17A is a side view of two pieces of an assembly system employing a linearly extended profile of the "double with slope" type, at the stage of manufacture;

FIG. 17B is a front sectional view of the two pieces represented in FIG. 17A;

FIG. 18 is a plan view of one of the pieces represented in FIG. 17A;

FIG. 19A illustrates the interaction of the two pieces of the system represented in FIG. 18A, at the stage of use;

FIG. 19B is a front view in section of the system represented in FIG. 19A;

FIGS. 20A, 20B and 20C represent respectively a lid, a container and their assembly for a boat-shaped tray including an assembly system employing a linearly extended profile of the "single with slope" type, at the stage of manufacture;

FIG. 21B is a front sectional view of the two pieces represented in FIG. 21A;

FIG. 21C is a plan view of the system represented in FIG. 21A;

FIG. 22A illustrates the interaction of the two pieces of the system represented in FIG. 21A, at the stage of use;

FIG. 22B is a front sectional view of the system represented in FIG. 22A, when the lid is just put on;

FIG. 22C is a front sectional view of the system represented in FIG. 22A, in use;

FIGS. 23A, 23B and 23C represent respectively a lid, a container and their assembly, for a boat-shaped tray including assembly systems such as those represented in FIGS. 21A to 22C;

FIG. 24A represents a moveable part of an assembly system according to the invention designed for fastening in hollow walls;

FIG. 24B represents the moveable part and the fixed part of the assembly system of FIG. 24A, before coupling;

FIG. 24C represents the assembly system of FIGS. 24A and 24B, in locked position;

FIGS. 25A and 25B are sectional views of the assembly system of FIGS. 24A to 24C, respectively before coupling and in locked position;

FIGS. 31A, 31B and 31C represent a first example of embodiment of an assembly system according to the invention, or a circular-section container such as a drinks can;

FIGS. 32A, 32B and 32C represent a second example of embodiment of an assembly system according to the invention, for a circular-section container such as a paint pot;

DESCRIPTION OF THE PREFERRED EMBODIMENTS

Figure 5A:
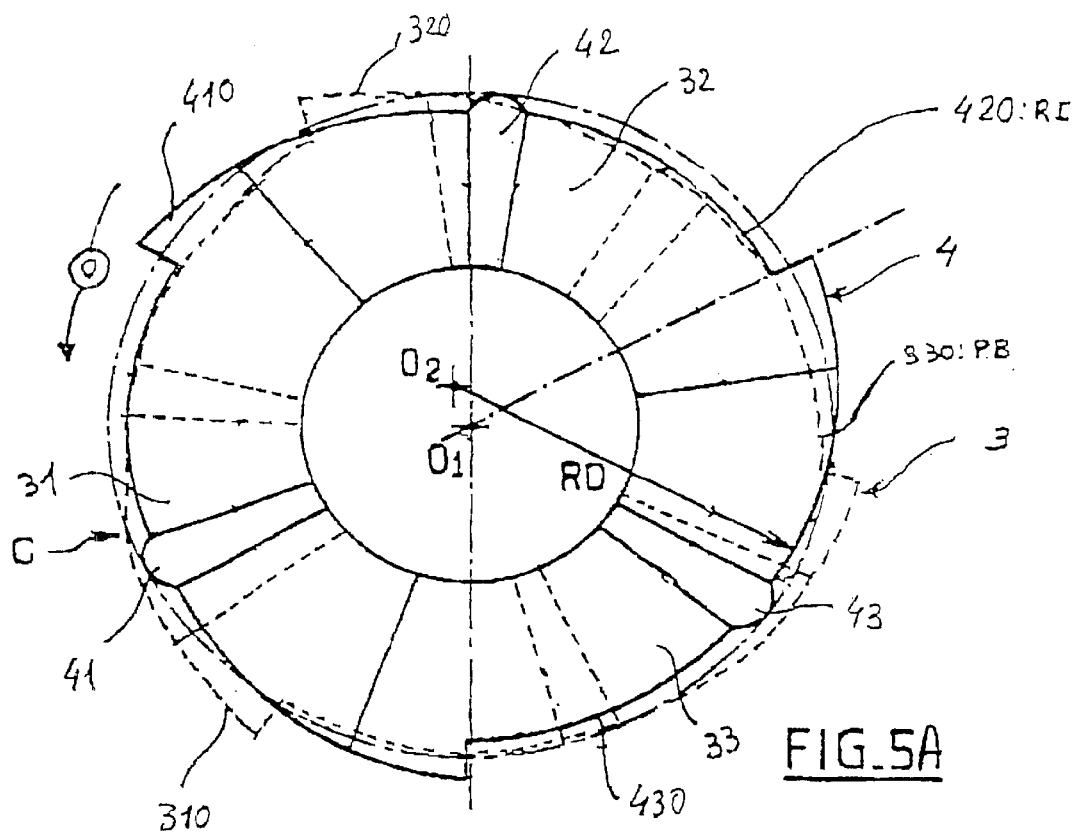
FIGS. 5A and 5B illustrates the kinematics of an assembly system according to the invention, of hermaphrodite-type with three slopes.

Several embodiments of assembly systems according to the invention will now be described as well as examples of cases and devices provided with this system, at the same time as the method of assembly employed in the system according to the invention. The same elements of different embodiments described will be denoted with the same references.

The first part of the present description is devoted to examples of assembly system embodiments according to the first version of the invention corresponding to the employment of barely-deformable or rigid materials. First, there will be described an embodiment of a case for compact discs according to the invention, referring to FIGS. 1A and 1B.

Referring to FIGS. 1A and 1B, a case 10 according to the invention comprises two parts of 1,2 of substantially lenticular form each comprising an internal recess 11,21 defining, when the two parts are coupled, an internal housing adapted to receive at least one disc and a central coupling device 100 constituted by a first coupling element 4 fixed to the first part 1 and a second coupling element 3 fixed to the second part 2. The case 10 can advantageously be disposed within a receptor frame 5, as illustrated in FIG. 3. This frame having for example an internal shoulder with a shape adapted to receive the external periphery of the case, and an external surround of any shape, for example of square shape identical to that of current cases for compact discs, or in the form of an eye.

The parts 1 and 2 can be made of any material including transparent injected plastic which can over all or part of their respective surfaces provide an optical magnification function. Their lenticular form contributes to this magnification function which can be more or less accentuated by using materials possessing appropriate optical indices.

The coupling device 100 is of helicoidal type, as illustrated in FIG. 2. The first coupling element 4, located at the center of the internal face of the first part 1, comprises by way of non-limiting example three radially disposed teeth 41, 42, 43 and each provided with a ramp 410, 420, 430 and a central hollow 44. The second coupling element 3 comprises a central hollow 34 and three radially disposed teeth 31, 32, 33 and each provided with a ramp 310, 320, 330. The first element 4 and the second element 3 are designed to be coupled in such a way that in the closed position, the respective teeth 41, 42, 43; 31, 32, 33 are respectively in tangential contact. The respective ramps 410, 420, 430; 310, 320, 330 of each coupling element 4, 3 are designed to be complementary in the closed position and to ensure an helicoidal displacement of the teeth 41, 42, 43; 31, 32, 33 in the opening and closing sequences of case 10, as will be described. It is to be noted that in this mode of coupling, one can advantageously see that the two coupling elements will be of a hermaphrodite type, the maintenance of the two parts in closed position being then ensured by a specific conformation of the teeth permitting them to overlap in the closed position.

One can design a case 50 according to the invention of the kind just described but made to contain two discs D1, D1, or alternatively one disc and a leaflet, as illustrated in FIG. 3.

A case according to the invention can thus be designed to receive one or more discs according to need. In a case designed for a single disc, this disc can be held in position on any one of the parts of the case by the holding means classically employed in cases for compact discs. In a case designed to receive several discs, these discs can he stacked up on a central axis provided on one of the parts of the case, or alternatively they can be distributed between one and the other parts. A booklet can advantageously replace one of the compact discs.

In another exemplary embodiment illustrated in FIG. 4, the case 30 is provided with a central coupling device 100' comprising a central female element 4' fixed to the first part 1 and a central male element 3' fixed to the second part 2. The central male element 3' can by way of non-limiting example comprise a three-point centering element and three deformable elements disposed in an equilateral fashion around the surround of the centering element. This male element 3' is thus designed to be inserted and retained by clamping in the female element 4'.

Figure 5B:
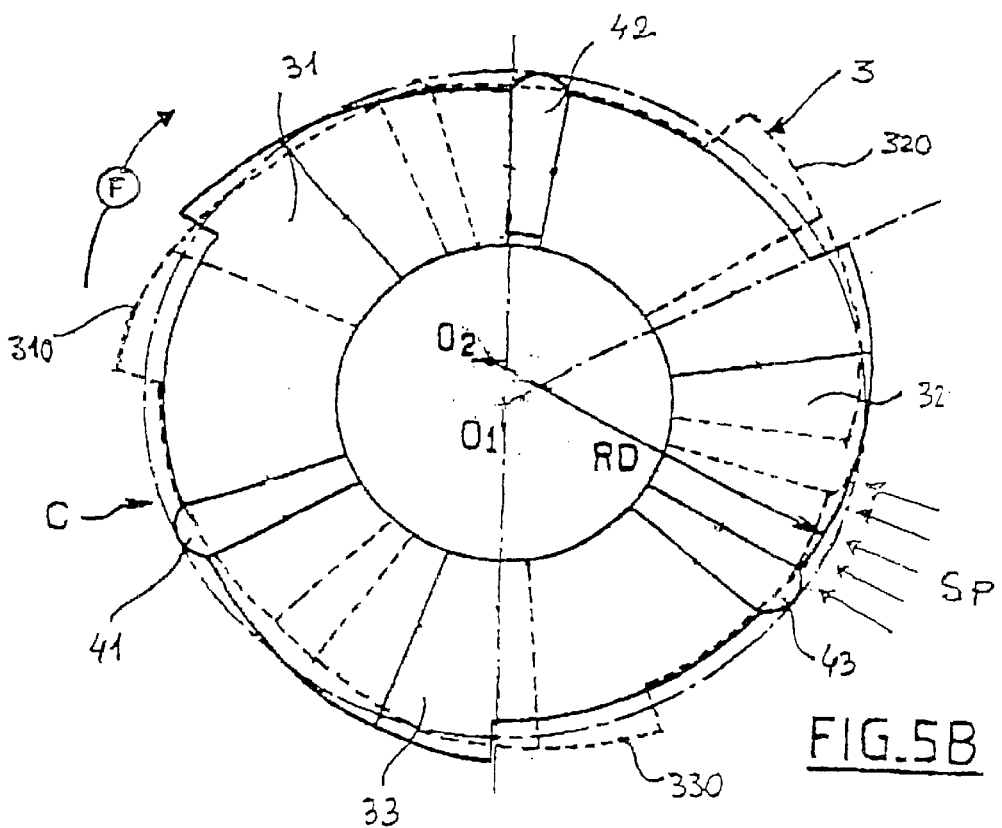
Figure 6:
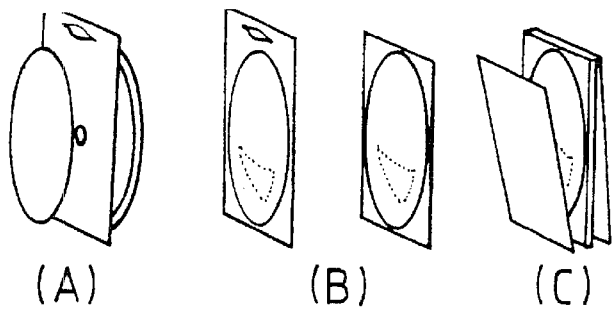
FIG. 6 illustrates several ways of using a case according to the invention between the two parts of which a jacket or a booklet is inserted.

In an example C of the kinematics of a system according to the invention, of the hermaphrodite type with three ramps is illustrated by FIGS. 5A and 5B, together with FIG. 2. FIG. 5A illustrates an opening situation (O), whereas FIG. 5B illustrates a closing situation (F). The phantom circle line shows a mean circle centered in 01 for revealing the effect of off-centering. In bottom figures, the top element is shown in dashed lines, the bottom element in solid lines. A helicoidal opening O is secured by rotation through a fraction of a turn in the counter-clockwise direction causing an ascent of the three inclined ramps. The closing F of the system is secured by rotation through a fraction of a turn in the clockwise sense causing a descent along the three inclined ramps RI. With reference to FIGS. 2 and 5, when the projecting parts of teeth 31, 32, 33 of the top element 3 reach the low levels PB of the hollow parts after bottom element 4, one then enters into a phase SP of progressive clamping which further permits an adjustment in the wear of the pieces. This progressive clamping function is obtained from the fact that the profile of the low level displays a curvature about the center 02 and the radius RD which is off-center relative to the principal center 01 of the system. This leads to a narrowing of the low level PB which is thus put to use to ensure the jamming of the pieces. The teeth 31, 32, 33, 41, 42, 43 of the respective top and bottom coupling elements 3, 4 each have a peripheral external shape, e.g., for tooth 43, the surface 439. Similarly, the hollow parts of coupling elements 3, 4 each have a peripheral external shape, e.g., peripheral wall 338 of tooth 33. In the assembled state, the peripheral external surfaces of the teeth are each in clamped contact against peripheral walls of the hollow parts.

Three embodiments of a closure-type device employing an assembly system according to the invention, will now be described by way of non-limiting examples, with reference to FIGS. 7, 8 and 9. In a first mode of embodiment corresponding to a need for strong retention (FIG. 7), the first and second pieces 71, 72 of the assembly system 70 according to the invention are provided with coupling pieces 73, 74 comprising an assembly of inclined ramps made in the way just described with reference to FIGS. 2 and 5. In this first mode of embodiment, the opening O is obtained by rotation through a fraction of a turn in a predetermined direction, for example counter-clockwise, whilst the closing F is obtained by rotation through a fraction of a turn in the opposite direction.

In a second embodiment represented in FIG. 8, the first and second removable pieces 81, 82 of the system 80 according to the invention are provided with coupling pieces 83, 84 each comprising an assembly of projecting elements 84 of substantially rounded shape made to penetrate in the closed position into the recesses arranged between the projecting elements of the facing removable piece. This embodiment enables opening and closing in the two directions.

In the third embodiment represented in FIG. 9, the two removable pieces 91, 92 of the system 90 according to the invention each has an edge of the interface 93, 94 of irregular profile, differing from the two other embodiments in which the edges of the interface in the closed position display an apparently regular or smooth exterior. This third embodiment can be chosen when one wishes for example to secure exterior visibility of the system for the user of the system.

There will now be described several examples of the application of assembly systems according to the invention, notably in the fields of cosmetics (FIGS. 10A to 10C), foodstuff supplies (FIGS. 11, 13 and 14), and fastening supplies (FIG. 12).

In the field of cosmetics and perfumery, boxes according to the invention can be designed to function as powder boxes, make-up palettes or alternatively to contain creams and any cosmetic products, notably stoppers and clasps.

Thus, with reference to FIGS. 10A, 10B and 10C one can design a powder compact 110 comprising two removable parts 112, 111 each in the region of their contact periphery comprising coupling elements 114 operating in the manner previously described, notably with reference to FIG. 5. The upper part 112 can advantageously be made from a transparent material and have a lenticular form providing an effective optical magnification, while the lower part 111 can equally be provided with an equally removable bottom part (not shown) to furnish for example a mirror or a make-up palette. The coupling elements 114*a–d* preferably have an asymmetric form and display a narrowing to ensure the progressive clamping function described previously, this narrowing corresponding for example to an off-centering of the radius of curvature of the low level of the coupling elements. Furthermore, one can envisage that the lower part 111 of the powder compact 110 is furnished in a presentation frame or case 115.

In the field of foodstuffs, one can design boxes according to the invention for containing alimentary products in the form of liquid, pastes, creams, yoghurt, sandwiches or even loose. One can notably envisage a box designed to receive a hamburger one can similarly design a food processor bowl provided with a first assembly system for its lid and with a second assembly system to ensure its locking onto the base of a food processor. One can also envisage a container 130 of the "shaker" type for making emulsions and mixtures, as illustrated in FIG. 13. In the closed position, the two removable pieces 131, 132 are fitted together, the sealing of the device 130 can be ensured by classical techniques of soldering. The two removable parts of a container of this type can be used as meal bowls. Another particularly advantageous example of use of the assembly systems according to the invention is as meal-trays 140 including on the upper face compartments furnished with an assembly of coupling elements 142 and arranged to receive removable pieces such as a plate 241 or glasses or goblets 141a–c provided with coupling elements 143, 243 co-operating with coupling elements 142 within the hollows of the tray 140 but equally able to be located on a table having no coupling system. One can thus supply clients of mass transportation (air, boat, car for example) with meal-trays possessing great stability without breaking away from the traditions of use.

In the field of consumer goods, boxes according to the invention can be employed to contain discs, do-it-yourself articles, decorations, jewels or indeed other objects. By way of non-limiting example, an attachment system 120 (FIG. 12) employing an assembly system according to the invention. This system is constituted on the one hand by a first coupling element 124 located at the extremity of a screw 121 and on the other hand by a second coupling element located within an hole 122 fashioned in a structure 125. Such a system of attachment permits for example the attachment of a piece 126 by rotation to the screw 121 through a fraction of a turn. Such a system can find applications for toys or again in the do-it-yourself sector or industrial attachments.

Within the scope of a second part of the description, there will now be described several examples of embodiments of assembly systems without under-cut according to the second version of the present invention, as well as the associated method of embodiment, with reference to FIGS. 15 to 32C.

The invention includes the manufacture of an assembly system employing thin walls, for example of foil materials, starting from plastic or metal foils. In the manufacturing phase (F) illustrated very schematically by FIG. 15, one considers two foils 152, 153 starting from which one makes shapes which are manufactured without undercut, from which low equipment costs and high production rates will follow. After manufacture, starting from two foils 152, 153 one arrives at an assembly system displaying for example a rectangular-section shape with respective flanges 521, 523; 531, 533 and a bottom 522, 532 and substantially planar edges 520, 530. At the stage of use (U) illustrated in FIG. 16, the relative displacement (D1ϵ153, D2ϵ152) and the deformation of the pieces 152, 153 contribute to the creation or the augmentation of forces normal to the interface zone. This leads to an "undercutting" effect which secures a retention (F1/F2) of the axis normal to the interface zone.

During the manufacture of packaging, one achieves the deformation by the form and/or the contra-form of material in foils, for example in the case of plastic thermo-forming, stamping metal, or again by suction (pressing-in) or by blowing (pressing-on). It usually brings about reduction in thickness substantially normal to the plane of manufacture by natural stretching. Thus the normal thickness of a foil is much greater than the thickness of the same foil in the natural stretching zone created by the stamping.

This often handicapping fact here finds use for it permits easy deformation of the surfaces substantially normal to the interface zone, due to a feeble moment of flexure. On the contrary, the surfaces parallel to the interface zone retain their initial thickness here ensuring a favorable moment of inertia to withstand the pressure.

A natural consequence is a deformation of the pieces in the course of clamping. The more one grips the more the materials deform, advantageously reinforcing:

the retention F1, F2 normal to the interface zone;

the sealing between the two surfaces.

This deformation principle of the present invention can for example be applied to make packaging having a linearly-extended profile of the "double with slope" type, with reference to FIGS. 17A, 17B, 18, 19A and 19B. Thus, at the stage of manufacture, one considers a foil 923 serving as lid and another foil 922 serving as base. The lid 923 displays a specific shape with edges 230, lateral flanges 231, 233 and a bottom 232, while the base 922 displays a shape of walls with flanges 221, 223 and a bottom 222.

At the stage of use, illustrated by FIGS. 19A and 19B, upon displacement D1 of the lid 923 against the base 922, one obtains an assembly acting by deformation of the contact surfaces of the two shapes, which ensures retention normal to the interface zone.

It is moreover possible to obtain a free-stop or alternatively a click-stop by dimensioning the materials in an appropriate fashion which then secures a blockage useful for retention normal to the interface zone. This free-stop possibility is obtained thanks to the dimensioning of deformable materials which at this moment serve the office of elimination of manufacture backlash, which could not be obtained with the previous methods of assembly.

This principle of assembly by shaping can be employed for example for boat-shaped trays, as illustrated in FIGS. 20A to 20C. In the assembly system designed for the boat-shaped tray 240 represented by FIGS. 20A to 20C, four assembly zones 2430; 2432 located on the lid 243 and on the box 242 are provided with possibilities of local deformation.

Another embodiment of a reversible assembly system according to the invention has a linearly-extended profile of the "single with slope" type, referring to FIGS. 21A to 21C and 22A to 22C. This type of embodiment is particularly adapted for tray 270 (FIGS. 23A to 23C) requiring only a middling level of retention normal to the interface zone. At the stage of manufacture, the upper part 253 of the assembly system according to the invention, corresponding to the lid of the boat-shaped tray, comprises a contact zone 2530 and a deformable wall 2531, while the lower part 252 comprises a contact zone 520, a deformable wall 2521 and a base zone 2522 upon which there is fixed a peelable protective cover 2524.

In use, the deformable parts 2521, 2531 of the upper and lower parts 253, 252 come into contact in the region which constitutes an interface zone. Their deformation results in the creation of an undercut which contributes to the normal retention of the system. The operation of the assembly system can for example take place after removal of the peelable protective cover 2524.

Assembly systems without a double-profile or single-profile slope can also be designed within the scope of the present invention.

The principle of normal retention by clamping and deformation which underlies the present invention can also be employed for the closure of containers of circular-cross section, of metallic cans, of paint cans, baby pots, etc., as illustrated in FIGS. 31A to 31C and 32A to 32C.

A can 380 may be provided with a first part of assembly 328 with progressive clamping, and with a lid 383 endowed with a second part of the assembly 384. This can 380 can furthermore be provided with a band of inviolability 386 (FIG. 31C). A suitable arrangement of the system according to the invention can thus be envisaged for the closure of a can of paint 3110, referring to FIGS. 32A to 32C, this can being provided with a first part of the assembly 3112 co-operating with a second part of the assembly 3114 provided on a lid 3113. The lids 383, 3113 respectively associated with the can 380 and the pot 3110 are advantageously provided on their upper parts with a radial piece 385, 3115 enabling a user to easily effect a rotary movement of these lids for opening them and closing them.

It is to be noted that one can advantageously arrange to engage part of the internal pressure of a can provided with an assembly system according to the invention so as to ensure the sealing of this system.

Figure 33:
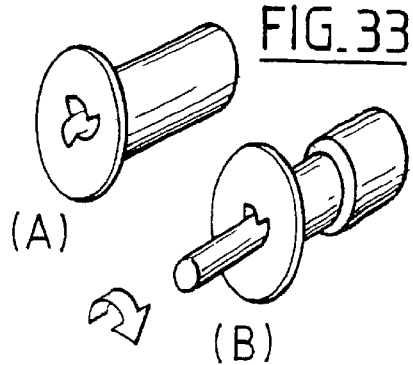
FIG. 33 illustrates an exemplary embodiment of a system of assembly according to the invention for enabling fastening in an hollow wall.
Figure 34:
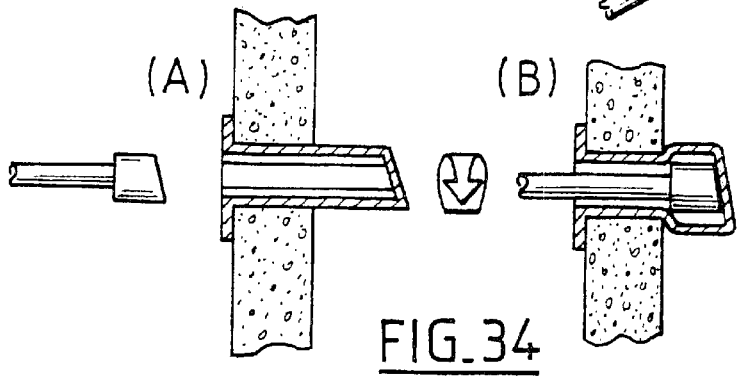
FIG. 34 is a sectional view of the assembly system in two characteristic situations.
Figure 26:
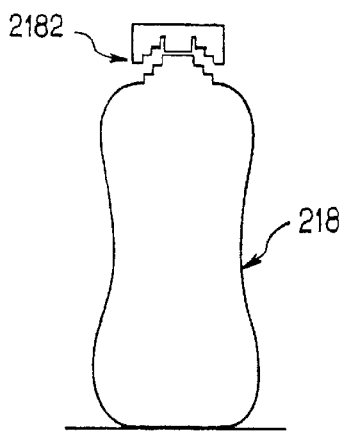
FIG. 26 illustrates a bottle fitted with a stopper employing a system according to the invention in a multilevel configuration.

Reversible assembly systems according to the invention can advantageously be applied to secure locking in position of accessories including loose pieces, such as projector supports, telescopic fishing rods or again elements for rapid wedging which can be employed for example in a truck or in the loading bay of a vessel or an aeroplane. In this kind of application one employs the functions of progressive clamping and of retention by deformation secured by the invention. One can also design assembly systems intended to achieve fastening in hollow walls, such as the system represented in FIGS. 24A–C, 25A–B or the system represented by FIGS. 33 and 34.

Another interesting application of the invention concerns nesting of conical tubular elements (FIG. 11) which can for example be employed to make signalling devices.

Figure 27:
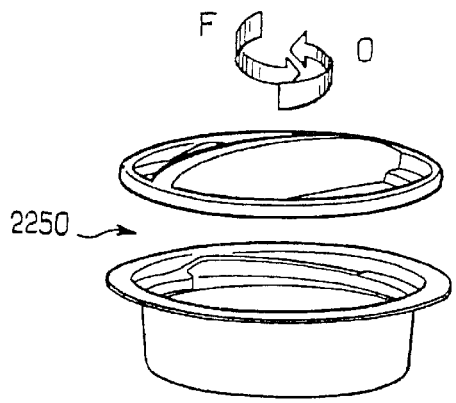
FIG. 27 represents a pot, for use for example in the foodstuffs or cosmetic fields, and provided with an assembly system according to the invention.
Figure 28:
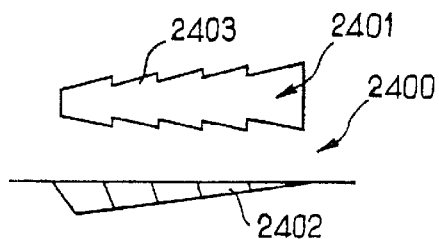
FIG. 28 represents a particular embodiment of an assembly system according to the invention, of non-reversible type.
Figure 29:
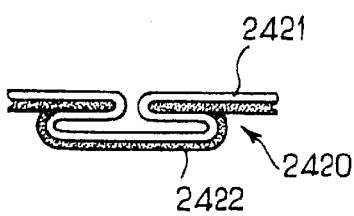
FIG. 29 represents another particular embodiment of an assembly system according to the invention, of nonreversible type.

Assembly systems according to the invention can be employed in numerous other applications. By way of non-limiting examples one can mention stoppers 2182 of the multilevel type for bottles 218 (FIG. 26), closure systems for shakers or closure systems 2250 for containers useable in foodstuffs or cosmetics (FIG. 27).

It is to be noted that the present invention also envisages assembly systems with progressive clamping and with normal retention of non-reversible character. For example, one can conceive a cold-fitting assembly system 2400 of the type represented in FIG. 28. A first part 2401 comprising a series of teeth 2403 having a specific profile can be coupled with a second 2402 itself comprising an internal profile adapted to receive the teeth of the first part. One can also envisage, with reference to FIG. 29, an assembly system 2420, corresponding specifically to shrink-fitting, in which two parts 2421, 2422 are intimately coupled after deformation.

Figure 30A:
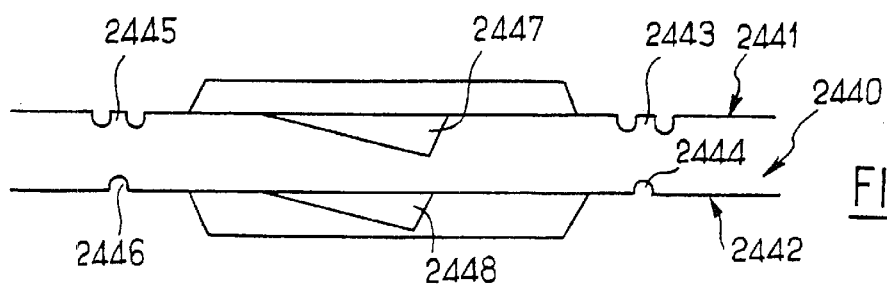
FIG. 30A represents the two parts of an assembly system according to the invention provided with complementary means for ensuring sealing of the closure.
Figure 30B:
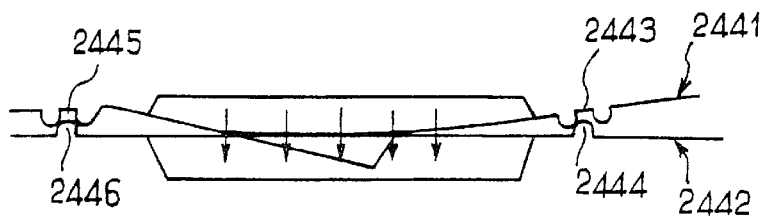
FIG. 30B represents the assembly system of FIG. 30A, in closed position.

When it is necessary to ensure a high level sealing of an enclosure provided with an assembly system according to the invention, one can with this system 2440 advantageously associate a device which makes it possible to exert a permanent pressure of the upper part 2441 upon the lower part 2442 of the system, as illustrated in FIGS. 30A and 30B. In this particular embodiment, the upper part 2441 comprises a coupling part 2447 and, at it's peripheral zones, dual bosses 2445, 2443 while the lower part comprises a coupling part 2448 and, at its peripheral zones, single bosses 2446, 2444 located substantially in threaded engagement with the dual bosses of the upper part 2441.

When effecting the assembly of the two coupling parts 2447, 2448 (FIG. 30B) bosses 2446, 2444 of the lower part enter into contact with the double bosses 2445, 2443 of the upper part 2441, which reveals itself by a click sound effect and by the creation of pressure forces in the region of the contact zone of the two parts due to the lifting of the peripheral zones of the upper part 2441.

The advantages achieved by the systems according to the invention are of many kinds, specifically: low cost of manufacture due to the absence of recourse to undercuts, advance in matters of hygiene due to the recloseability of the system, safety in handling. In fact so far as concerns this latter point, it is to be noted that for boat-shaped trays thermoformed in plastic, notably for alimentary, pharmaceutical or other intended uses, the assembly system according to the invention has rounded edges without any projecting angles which represents an advantage as regards safety, compared with systems having sharp edges.

In existing systems, the atmosphere contained within the enclosure is retained by a peelable protective cover separate from the recloseable lid, which increases the initial cost (material and method) and introduces recycling problems.

The assembly system according to the invention can be easily put into production on a large scale, notably because it can put up with a great flexibility as regards tolerances and does not require complicated equipment and enables great rapidity of manufacture.

Whereas previously there was required a lid and a sealing film, now a single product achieves both functions. In the factory, the lid is put on without being clamped. A peelable joint is then achieved all round in order to achieve sealing and preservation, ensuring an ad hoc bacteriological and chemical barrier. The user just peels the lid from the base. This lid tightens up afterwards to reclose the boat-shaped tray.

As the assembly system according to the invention can be manufactured in a single material, its recycling is made easier. Moreover, one can envisage reuse of the products if one opts for deformation solutions that do not exceed the elastic limit of the material.

For drink cans made of metal, thanks to rounded edges without any projecting angle, one is freed from danger of wounds during consumption, about the lips or fingers. Furthermore, the assembly system according to the invention makes it possible to provide smooth surfaces that do not retain the liquid on the exterior of the contents. Furthermore the assembly system according to the invention can provide for re-closeability thanks to a handle incorporated in the lid directly during manufacture. Moreover, the lid can cover the whole of the upper surface to avoid deposit of dust which would run the risk of mixing with the liquid.

In the assembly system according to the invention the lid is normally clamped in the factory thus creating the "screw thread" which would necessitate a greater force due to the resistance of the materials to deformation, with for example a tongue turned down and stuck on to guarantee inviolability. It is equally possible to make a roll-on around the periphery to retain the stopper.

The assembly system according to the invention comprises, in this field of application, three pieces in place of four in existing systems, which is a plus as regards the management of production. Furthermore, one can envisage the possibility of packaging parallel to the manufacture of the lids in particular enabling a greater flexibility thanks to a separation between manufacturing and packaging units.

In the case of the application of the invention for metallic containers, notably paint pots, the assembly system according to the invention here introduces greater safety in handling. In fact, the existing manipulation of pots of paint requires the use of complementary implements such as screw-drivers for opening them and hammers for closing them. With the assembly system according to the invention, opening and closing paint pots can be effected without the use of tools, which is a significant advantage.

Of course the invention is not limited to the examples just described and numerous adaptations can be introduced into these examples without going outside the scope of the invention. Thus the materials employed for making cases or boxes can be other than plastic materials. Moreover, in the particular application to cases for compact discs, the number of discs contained in the case according to the invention is only limited by mechanical manufacturing constraints.

Furthermore, the dimensions of a case according to the invention are not limited to the existing compact format and can vary dependent upon the evolution and diversification of future disc formats.

Furthermore, by way of non-limiting examples of applications, one can mention screw drivers, telescopic fishing rods, adjustable brushes, keeper shims employed to maintain distances or to adjust a gap, elements for rapid wedging intended for example for storage or for handling, perfume diffusers, locking devices against elevation/depression for projectors or foodstuff pots provided with a complementary compartment. The present invention can equally find numerous applications in sectors requiring quick and easy mountings. By way of non-limiting examples one can specifically mention the sectors of medical emergencies, dental care, paediatric nursing, do-it-yourself and recreation.

What is claimed is:

1. An assembly comprising:

a device having a first part and a second part;

a first coupling means located on the first part;

a second coupling means located on the second part, the first and second coupling means being apart from each other in an un-assembled state and being coupled together in an assembled state to form said assembly so as to form a helicoidal coupling device, the first and second coupling means being arranged to engage and to co-operatively clamp together to provide a progressive clamping by a relative displacement of one of the first and second parts in relation to another of the first and second parts, the progressive clamping being by a generation of forces substantially normal to the relative displacement;

one or more ramps inclined relative to a plane of assembly and located on internal faces of the first and second coupling means, the ramps of the first and second coupling means co-operating to secure the first part to the second part by coupling and to separate the first part from the second part by decoupling of the first and second parts; and the first and second coupling means further including peripheral external shapes arranged to join together, in the assembled state, said corresponding first and second coupling means in a direction normal to the relative displacement, wherein the first and second parts form a case, when in the assembled state, defining an internal container space.

2. The assembly of claim 1, wherein the ramps of the first and second coupling means further comprise a hollow lower part and projecting upper part emerging relative to an interface region between the two first and second parts, and in the assembled state, the projecting upper part of each ramp is accommodated in the hollow lower part of a corresponding ramp, the hollow parts being radially deformed.

3. The assembly of claim 1, wherein the first and second coupling means are located respectively at centers of the first and second parts and the first and second coupling means are identical.

4. The assembly of claim 1, wherein at least one of the first and second parts comprise a zone providing an optical magnification.

5. The assembly of claim 1, further comprising a receptor frame one of the first and the second ports being mounted in the receptor frame.

6. The assembly of claim 5, wherein the receptor frame comprises an external contour adapted to permit vertical stacking.

7. The assembly of claim 5, wherein the receptor frame is eye-shaped.

8. The assembly of claim 5, wherein the receptor frame is integrally formed with the one of the first and second parts.

9. The assembly of claim 4, further comprising a removable insert located intermediate and extending beyond the first and second parts.

* * * * *